(12) United States Patent
Dennin, III et al.

(10) Patent No.: US 10,901,868 B1
(45) Date of Patent: Jan. 26, 2021

(54) SYSTEMS AND METHODS FOR ERROR RECOVERY IN NAND MEMORY OPERATIONS

(71) Applicant: Marvell International Ltd., Hamilton (BM)

(72) Inventors: William W. Dennin, III, Mission Viejo, CA (US); Chengkuo Huang, Los Altos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 191 days.

(21) Appl. No.: 16/149,831

(22) Filed: Oct. 2, 2018

Related U.S. Application Data

(60) Provisional application No. 62/566,950, filed on Oct. 2, 2017.

(51) Int. Cl.
*G06F 11/20* (2006.01)
*G06F 11/16* (2006.01)

(52) U.S. Cl.
CPC ...... *G06F 11/2094* (2013.01); *G06F 11/1666* (2013.01); *G06F 2201/805* (2013.01)

(58) Field of Classification Search
CPC ............. G06F 11/2094; G06F 11/2056; G06F 11/1064; G06F 11/1666
See application file for complete search history.

(56) References Cited

U.S. PATENT DOCUMENTS

| | | | | |
|---|---|---|---|---|
| 5,123,099 A | * | 6/1992 | Shibata | G06F 11/1666 711/120 |
| 5,437,022 A | * | 7/1995 | Beardsley | G06F 11/1666 711/120 |
| 5,771,367 A | * | 6/1998 | Beardsley | G06F 11/1435 711/113 |
| 8,099,554 B1 | * | 1/2012 | Solomon | G06F 12/0866 711/102 |
| 8,812,899 B1 | * | 8/2014 | Fultz | G06F 12/0886 714/6.1 |
| 10,146,616 B1 | * | 12/2018 | Shilane | G06F 12/0833 |
| 2010/0318721 A1 | * | 12/2010 | Avila | G11C 11/5628 711/103 |
| 2014/0189421 A1 | * | 7/2014 | Werner | G06F 3/0688 714/6.21 |
| 2014/0325315 A1 | * | 10/2014 | Warnes | G11C 29/52 714/767 |
| 2015/0032981 A1 | * | 1/2015 | Kawada | G06F 11/2064 711/162 |
| 2016/0092325 A1 | * | 3/2016 | Bar | G06F 11/0775 714/6.1 |
| 2017/0123946 A1 | * | 5/2017 | Wu | G06F 11/1441 |
| 2017/0161162 A1 | * | 6/2017 | Blea | G06F 11/2094 |
| 2017/0169902 A1 | * | 6/2017 | Chun | G06F 12/0246 |

* cited by examiner

*Primary Examiner* — Yolanda L Wilson (57) ABSTRACT

Embodiments described herein provide a mechanism to use an on-chip buffer memory in conjunction with an off-chip buffer memory for interim NAND write data storage. Specifically, the program data flows through the on-chip buffer memory to the NAND memory, while simultaneously a copy of the NAND program data is buffered in one or more circular buffer structures within the off-chip buffer memory.

20 Claims, 6 Drawing Sheets

SYSTEMS AND METHODS FOR ERROR RECOVERY IN NAND MEMORY OPERATIONS

CROSS-REFERENCE TO RELATED APPLICATION

This disclosure claims the benefit under 35 U.S.C. § 119(e) of U.S. Provisional Patent Application No. 62/566,950, filed on Oct. 2, 2017, which is hereby incorporated by reference herein in its entirety.

FIELD OF USE

This disclosure relates to flash memory operations, and specifically, to error recovery in NAND memory operations.

BACKGROUND OF THE DISCLOSURES

NAND type flash memory has been widely used in memory cards, USB flash drives, solid-state drives for general storage and transfer data because of its non-volatile property and relatively fast read access times. In some applications, NAND memory is used to store configuration data in digital devices. When a write error occurs during a NAND program operation, the host system usually needs to re-access the original data and re-write the data to the NAND memory so as to complete the NAND program write operation. Due to NAND device program latencies and high host data rates, the amount of data that needs to be re-written when the write error occurs may often exceed what is reasonably accommodated with on-chip (i.e., on-die) buffer memory.

SUMMARY

Embodiments described herein provide a method for a system for error recovery in NAND memory operations. The system includes a host interface, a program data splitter, and control logic. The host interface is configured to receive, from a host system, program data having a plurality of program data elements to be written to a NAND memory. The program data replay splitter is configured to send the program data to an internal buffer memory and an external buffer memory in parallel. The program data replay splitter is further configured to obtain a first alert indicative of a first NAND operation error of a first failed program data element, and in response to the first alert, determine a memory address within the external buffer memory, at which a copy of the first failed program data element was previously buffered, based on information identifying the first failed program data element from the first alert. The control logic is configured to retrieve the copy of the failed program data element from the external buffer memory based on the determined memory address, and send the copy of the first failed program data element to the NAND memory to recover the first NAND operation error.

In some implementations, the program data replay splitter is configured, when sending the program data to an internal buffer memory and an external buffer memory in parallel, further to forward the program data to the internal buffer memory that is disposed on a same die with the program replay data splitter, and forward the same program data to the external buffer memory that is disposed at a location outside the die with the program replay data splitter.

In some implementations, the program data replay splitter is configured further to determine a characteristic of a given program data element from the program data, and determine a first circular buffer corresponding to the characteristic. The external buffer memory has a plurality of circular buffers, and each of the plurality of circular buffers corresponds to a specific characteristic of the program data. The program data replay splitter is further configured to send the given program data element to the first circular buffer.

In some implementations, each of the plurality of circular buffers has a respective primary circular buffer and a respective secondary circular buffer. The control logic is configured further to write the given program data element to a current address within a first primary circular buffer at the first circular buffer, wherein the current address is indicated by a first primary buffer write pointer. The control logic is further configured to determine a next address by adding a size of the program data element to the current address, and update the first primary buffer write pointer to the next address.

In some implementations, the control logic is configured further to, in response to the first alert, obtain information identifying the first failed program data element from the first alert, and determine the first circular buffer having a matching characteristic with the first failed program data element based on the information identifying the first failed program data element.

In some implementations, the control logic is configured further to suspend writing the program data to the first primary circular buffer after completing writing the given program data element, and switch to a first secondary circular buffer at the first circular buffer to receive a new program data element that is received at the first circular buffer.

In some implementations, the control logic is configured further to move a first primary buffer read pointer from the current address towards a direction of a prior address that buffered the program data prior to the program data element until the copy of the first failed program data element that was previously buffered is located, and read the copy of the first failed program data element from an address corresponding to the first primary buffer read pointer.

In some implementations, the control logic is configured further to when the new program data element has a matching characteristic with the first circular buffer, continue buffering the new program data element at the first secondary circular buffer while searching for the copy of the first failed program data element at the first primary secondary circular buffer at a same time.

In some implementations, the program data replay splitter is configured further to receive a second alert indicative of a second NAND operation error of a second failed program data element after the switching. The control logic is configured further to suspend writing new program data to the first secondary circular buffer while the first primary circular buffer is still suspended from writing new program data, and suspend, at a host interface, receiving new program data from the host system.

In some implementations, the control logic is configured further to determine, at the program data replay splitter, whether the internal buffer memory and the external buffer memory are ready to receive data. The control logic is further configured to in response to determining that one of the internal buffer memory and the external buffer memory is not to receive data, temporarily restrict from sending the program data to either of the internal buffer memory and the external buffer memory such that program data reception at the internal buffer memory and the external buffer memory is synchronized.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for error recovery with an off-chip memory buffer in NAND memory operations.

Off-chip buffer memory has been adopted to store program data in between NAND program operations so that when an error occurs in a NAND write operation, the errored data can be recovered by buffered data retrieved from the off-chip buffer memory. Some existing systems adopt a large off-chip memory buffer to buffer a significant amount of program data in between NAND operations such that sufficient data can be retrieved for error recovery even in view of high NAND device program latencies and host data rates. However, a wide external data path and additional external memory devices are usually required to match the off-chip memory buffer throughput with a high bandwidth host interface. The wide data path to the off-chip memory may improve bandwidth, but may also result in higher power consumption and/or a larger die area of the chip, which would inevitably increase the cost per die and thus increase cost of the end product.

In view of this problem, system and methods described herein provide a mechanism to use an on-chip buffer memory in conjunction with an off-chip buffer memory for interim NAND write data storage. Specifically, the program data flows through the on-chip buffer memory to the NAND memory, while simultaneously a copy of the NAND program data is buffered in one or more circular buffer structures within the off-chip buffer memory. Each circular buffer structure is designated as the recipient of a specific class of write data such as separate name spaces, or data formats. In addition, the circular buffer structures are allocated in primary and secondary groups such that writing to the primary buffer is suspended upon NAND program write error detection and host data reception can continue using the corresponding secondary buffer. In this way, the NAND program write error recovery action can locate and replay the failed data element from the primary buffer while the secondary buffer keeps buffering new data elements simultaneously.

In one embodiment, the provided mechanism does not require program data to flow through the external off-chip buffer memory unless error recovery is required. Therefore, in the absence of NAND operation errors, the average external buffer memory throughput required by program data is half of what is required by traditional systems where program data need to flow in and out of the external buffer memory. In this way, the provided mechanism sustains a high host program data throughput while recovering from NAND program errors by using a reasonably sized on-chip buffer memory in conjunction with an off-chip buffer memory, without adding a wide data path to an off-chip buffer memory.

Figure 1:
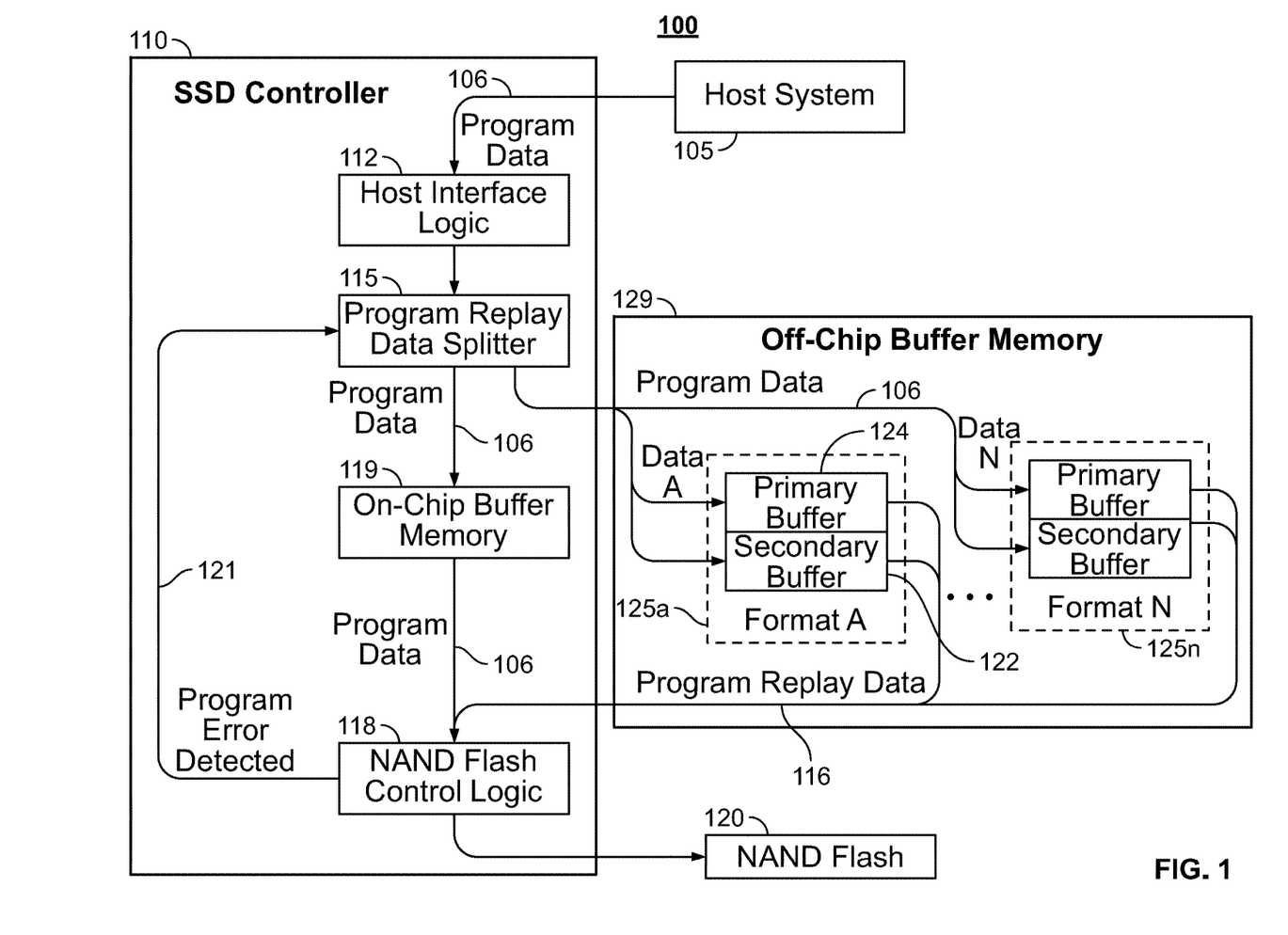
FIG. 1 provides an example block diagram illustrating an example structure of a NAND memory storage system with an off-chip buffer memory and an on-chip buffer memory, according to an embodiment described herein.

FIG. 1 provides an example block diagram 100 illustrating an example structure of a NAND memory storage system with an off-chip buffer memory and an on-chip buffer memory, according to an embodiment described herein. Diagram 100 shows a host system 105, a solid-state drive (SSD) controller 110, an off-chip buffer memory 129 (on a different circuit chip from the SSD controller 110) and a NAND flash memory 120 interacting with each other. Specifically, the host system 105, which may be any processing or computing system such as a computer, etc., is configured to store program data 106 to a NAND flash memory 120. For example, the host system 105 may issue a command to send a block of program data 106 to be stored at a destined address at the NAND memory 120.

A SSD controller 110 is communicatively coupled to the host system 105 and the NAND flash memory 120. Specifically, the SSD controller 110 is configured to receive the program data 106 from the host system 105, and then write the program data 106 to the NAND memory 120. The SSD controller 110 includes host interface logic 112, a program replay data splitter 115, an on-chip buffer memory 119, and NAND flash control logic 118. The host interface logic 112 is configured to receive program data 106 from the host system 105, and then route the program data 106 to the program replay data splitter 115.

The program replay data splitter 115 is disposed in the receive data path between the host interface logic 112 and the on-chip memory buffer 119. The program replay data splitter 115 is configured to send the program data 106 to the on-chip buffer memory 119. In parallel, the program replay data splitter 115 is configured to distribute a copy of each program data element 106 to a specific circular buffer structure in the off-chip buffer memory 129. Specifically, the off-chip buffer memory 129 includes a number of circular buffers 125a-n, each of which is designated to buffer program data elements 106 having certain characteristics, such as a specific data format or a specific data group. The program data 106 usually contains multiple blocks of data of different formats. Each data block has a different length (e.g., 500 bytes, 600 bytes, 800 bytes, etc.) of payload data and error protection information based on a specific host protocol. For example, the namespace of the program data block may be used as an indicator of the data format. In another example, in SAS file systems, the logical number assigned to each data block may be used as the indicator of the data format.

Each circular buffer structure (any of 125a-n) in the off-chip buffer memory 129 includes two buckets of circular buffers, i.e., a primary buffer 124 and a secondary buffer 122. Each circular buffer controller corresponding to the respective circular buffer comprises a set of buffer addresses (pointers) including: 1) the next read address in the respective circular buffer (or read pointer); 2) the next write address in the respective write buffer (or write pointer); 3) the base address of the respective circular buffer (or the reload address); 4) the ceiling address of the respective circular buffer (or the limit address); and 5) the size of the respective circular buffer (the maximum number of program data elements that can be stored at the respective circular buffer).

Each circular buffer 125a-n is operated as follows: as each program data element is written into a given circular buffer, the respective circular buffer controller (e.g., primary 125 or secondary 122) is configured to adjust the corresponding next write address by the size of the data element, e.g., by adding the size of the data element to the current write address to obtain the next write address. Once the respective circular buffer is full, the respective circular buffer controller is configured to adjust both the next write address and the next read address by the size of the respective program data element written. In this way, each circular buffer controller provides an adjustable sliding history window with the oldest program data element that was previously written into the buffer starting at the next read address. The circular structure of the buffer provides a storage structure of the program data elements which are buffered in order according to the respective timestamp that each program data element was received.

The NAND flash control logic 118 is configured to retrieve program data 106 from the on-chip buffer memory 119 and write the retrieved data to the NAND flash memory 120. When a NAND operation error occurs, the NAND flash control logic 118 is configured to send an alert signal 121 indicative of the program error detected 121 to the program replay data splitter 115 for replaying the original program data from the corresponding circular buffer structure. For example, when a write operation fails and the NAND flash control logic 118 needs to re-write the failed data to the NAND flash memory 120, the program replay data splitter 115 is configured to send a signal to the off-chip buffer memory 129, requesting a buffered copy of the failed data (the program replay data 116) to be sent to the NAND flash control logic 118. In this way, the NAND flash control logic 118 can recover the write error by re-writing the program replay data 116 to the NAND flash memory 120.

Specifically, when a NAND program error is detected, the NAND Flash control logic 118 sends an alert signal 121 indicative of the program error detected to the program replay data splitter 115. The alert signal 121 may indicate identifying information of which program element has failed to be written to the NAND flash memory 120. In response to the alert signal, the program replay data splitter 115 continues receiving new program data 106 from the host interface logic 112, until reaching the boundary of the next program data element boundary. The program replay data splitter 115 then switches program data collection from the current circular buffer controller to the next circular buffer controller within the same circular buffer structure, e.g. from primary buffer 124 to the second buffer 122, or vice versa. In this way, the program reply data splitter 115 can continue buffering newly received program data elements 106 at the switched buffer.

Once data collection by the current circular buffer controller has been suspended, firmware can locate, within the current circular buffer, a copy of the failed data, based on information contained in the alert signal 121, and then retry the failed program operation with the copy of the failed data, e.g., by writing the program reply data element 116 to the NAN flash memory 120 via the NAND flash control logic 118. In this way, the primary-secondary buffer controllers 122 and 124 allow the program replay data splitter 115 to continue buffering program data 106 into the circular buffer, while locating and retrieving a copy of the failed data in response to the alert signal of operation error.

If a second NAND program error is detected right after switching circular buffer controllers, e.g., from the primary 124 to the secondary 122, then program data collection by the secondary circular buffer controller is suspended at the next program data element boundary. At this time, both circular buffer controllers corresponding to both circular buffers 122 and 124 are suspended, program data reception at the host interface logic 112 is then suspended consequently.

The suspension of program data reception when two program errors are detected in consecutive operations provides that program data passing through the on-chip memory buffer 119 is always buffered as a replay copy at the off-chip buffer memory 129 for future error recovery.

Figure 2:
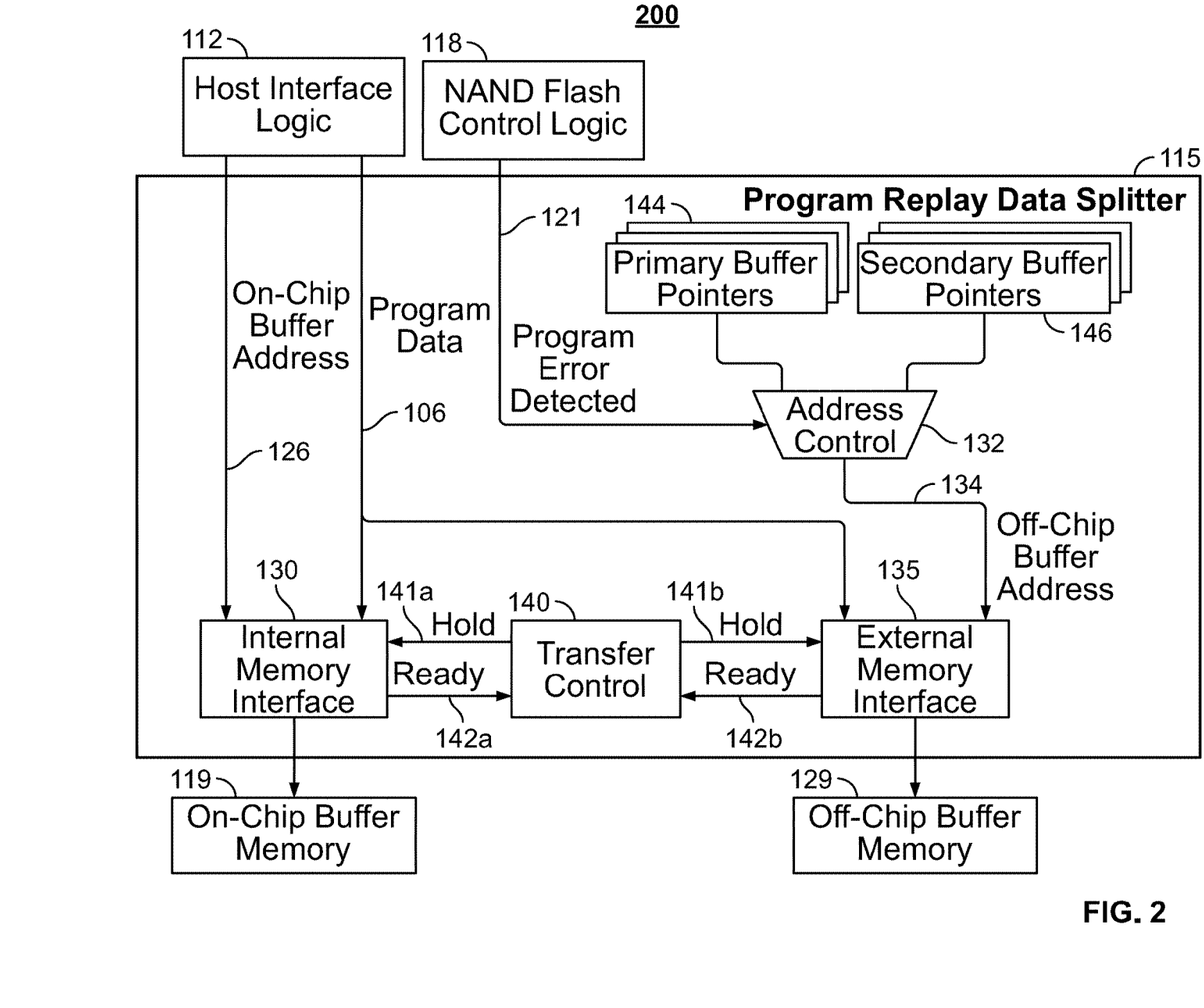
FIG. 2 provides an example block diagram illustrating a detailed view of the program replay data splitter shown in FIG. 1, and interactions of the program replay data splitter 115 with other components of the NAND memory system to buffer and/or retrieve data from the on-chip buffer memory, or the off-chip buffer memory to recover a NAND operation error, according to an embodiment described herein.

FIG. 2 provides an example block diagram 200 illustrating a detailed view of the program replay data splitter 115 shown in FIG. 1, and interactions of the program replay data splitter 115 with other components of the NAND memory system to buffer and/or retrieve data from the on-chip buffer memory, or the off-chip buffer memory to recover a NAND operation error, according to an embodiment described herein. As shown in diagram 200, all program data 106 from the host interface logic 112 and destined for the on-chip memory buffer 119 is intercepted by the program replay data splitter 115.

Then, the original program data 106, together with the on-chip buffer address 126 obtained from the host interface logic 112, is forwarded to the on-chip memory buffer 119 via an internal memory interface 130. In parallel, a copy of the program data 106 is written to a circular buffer structure (e.g., see 125a-n in FIG. 1) in the external buffer memory 129 based on the program data characteristics (e.g. block format, namespace, etc.).

The program replay data splitter 115 further includes an address control unit 132, and stored primary buffer pointers 144 and secondary buffer pointers 146. The address control unit 132 is configured to determine an off-chip buffer address 134 to access the off-chip buffer memory 129. As described in relation to FIG. 1, when a NAND error occurs, the NAND flash control logic 118 sends an alert signal 121 to the program replay data splitter 115, which is received at the address control unit 132. The address control unit 132 is then configured to determine, based on identifying information of the failed data element from the alert signal 121, an address or pointer, either from the primary buffer pointers 144 or the secondary buffer pointers 146, representing the address at which a copy of the failed data element was previously buffered in the circular buffer in the off-chip buffer memory 129.

For example, when the alert signal 121 is received at the address control unit 132, if the primary buffer controller has been used to buffer the program data 106, the program replay data splitter 115 switches to the secondary buffer controller as described in relation to FIG. 1. The primary buffer controller is in turn suspended, and the address controller 132 then starts from the current address (pointer) in the primary buffer controller and moves backwards, e.g., in the opposite direction as the primary buffer pointer 144 moves while buffering the program data, until the address or pointer in the primary buffer relating to the failed data element is located. Thus, the address control unit 132 obtains the primary buffer pointer from 144 representing the off-chip buffer address 134, which is sent to the external memory interface 135.

The program replay data splitter 115 further includes an external memory interface 135 that interfaces the off-chip buffer memory 129. The external memory interface 135 is configured to determine which circular buffer, e.g., one of 125a-n, the failed data element is to be retrieved, based on a data format of the failed data element. The external memory interface 135 then sends a read request including an indication of the data format and a respective primary buffer pointer or a secondary buffer pointer to the off-chip buffer memory 129. The off-chip buffer 129 then locates the circular buffer that matches with the data format, and then retrieves the previously buffered data element at the address indicated by the respective primary buffer pointer or the secondary buffer pointer within the circular buffer.

The program replay data splitter 115 further includes a transfer control unit 140 communicatively coupled to the internal memory interface 130 and the external memory interface 135. The transfer control unit 140 is configured to synchronize writing program data 106 to the on-chip buffer memory 119 and the off-chip buffer memory 129, respectively. Specifically, when one of the on-chip buffer memory 119 or off-chip buffer memory 129 is not ready to receive new data, the transfer control 140 sends a hold signal 141a or 141b to the internal memory interface 130 or the external memory interface 135, respectively, to temporarily hold new data to the buffers. When the two memories 119 and 129 are ready to receive data, the internal memory interface 130 or the external memory interface 135 sends a ready signal 142a or 142b respectively to the transfer control unit 140. In this way, the transfer control unit 140 is configured to synchronize the program data written to the on-chip buffer memory 119 and the off-chip buffer memory 129. When an error occurs, a copy of the failed data element can always be found in the off-chip buffer memory 129 because any data element that was sent to the on-chip buffer memory was sent to the off-chip buffer memory 129 in parallel.

Figure 3:
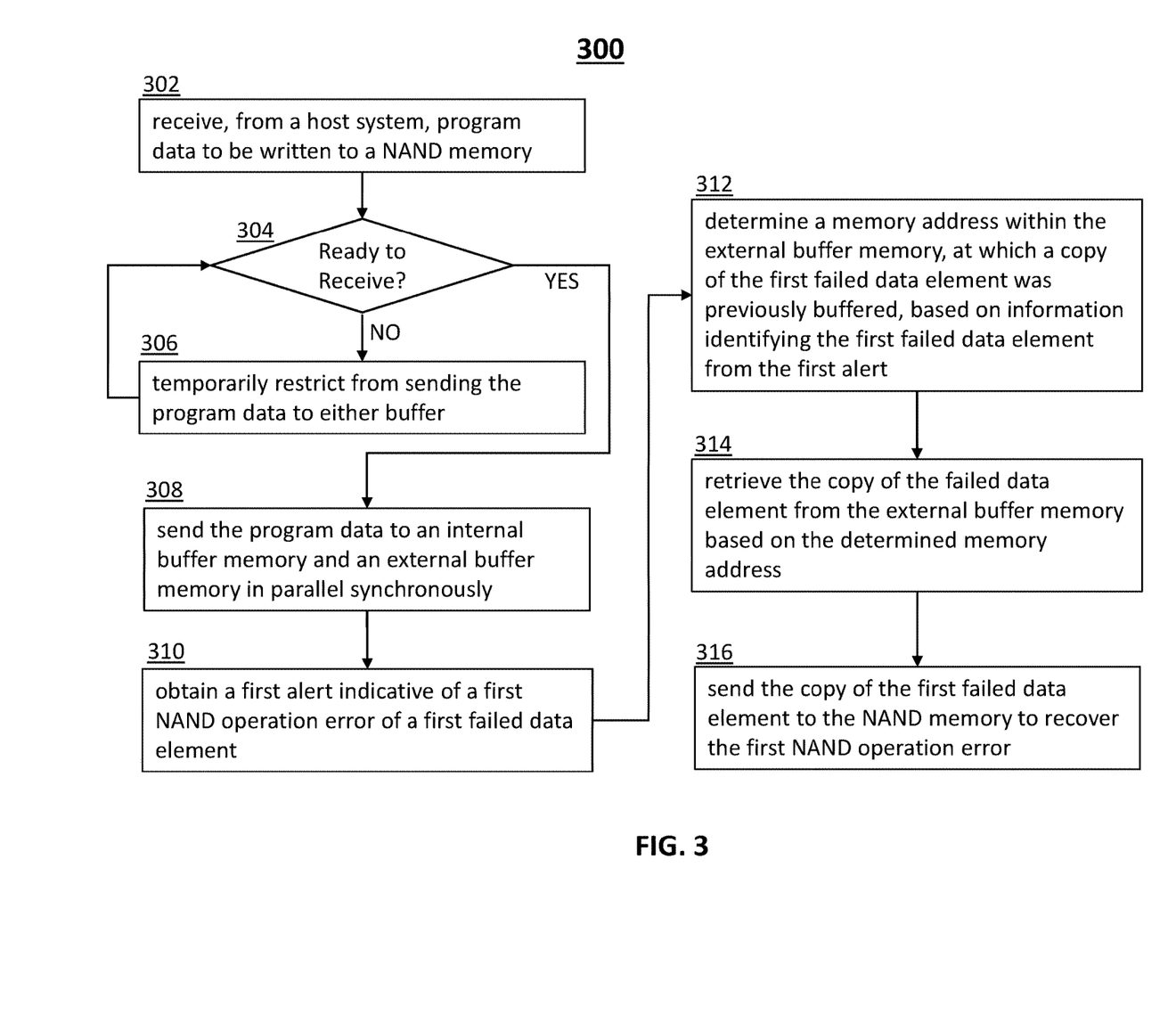
FIG. 3 provides an example logic flow diagram illustrating NAND memory error recovery in a NAND memory system similar to system described in FIG. 1 or FIG. 2, according to embodiments described herein.

FIG. 3 provides an example logic flow diagram 300 illustrating NAND memory error recovery in a NAND memory system similar to system 100 described in FIG. 1 or system 200 in FIG. 2, according to embodiments described herein. At 302, control logic, which includes the host interface logic (e.g., 112 in FIG. 1), receives from a host system (e.g., 105 in FIG. 1) program data (e.g., 106 in FIG. 1) to be written to a NAND memory (e.g., 120 in FIG. 1). At 304, control logic, e.g., at the transfer control logic 140 in FIG. 2, determines whether an internal buffer memory (e.g., 119 in FIGS. 1-2) and an external buffer memory (e.g., 129 in FIGS. 1-2) are ready to receive data. If at least one of the buffers is not ready to receive, control logic temporarily restricts from sending the program data to either of the internal buffer memory and the external buffer memory such that program data reception at the two buffers is synchronized, at 306. If both the internal buffer and the external buffer are ready to receive, process 300 proceeds to 308, where the program data replay splitter (e.g., 115 in FIG. 1) synchronously sends the program data to the internal buffer memory and the external buffer memory in parallel. At 310, the program data replay splitter obtains a first alert (e.g., 121 in FIG. 1) indicative of a first NAND operation error of a first failed data element. At 312, the program data replay splitter determines a memory address within the external buffer memory, at which a copy of the first failed data element was previously buffered, based on information identifying the first failed data element from the first alert. At 314, the copy of the failed data element is retrieved from the external buffer memory based on the determined memory address. At 316, the copy of the first failed data element is sent to the NAND memory to recover the first NAND operation error.

Figure 4:
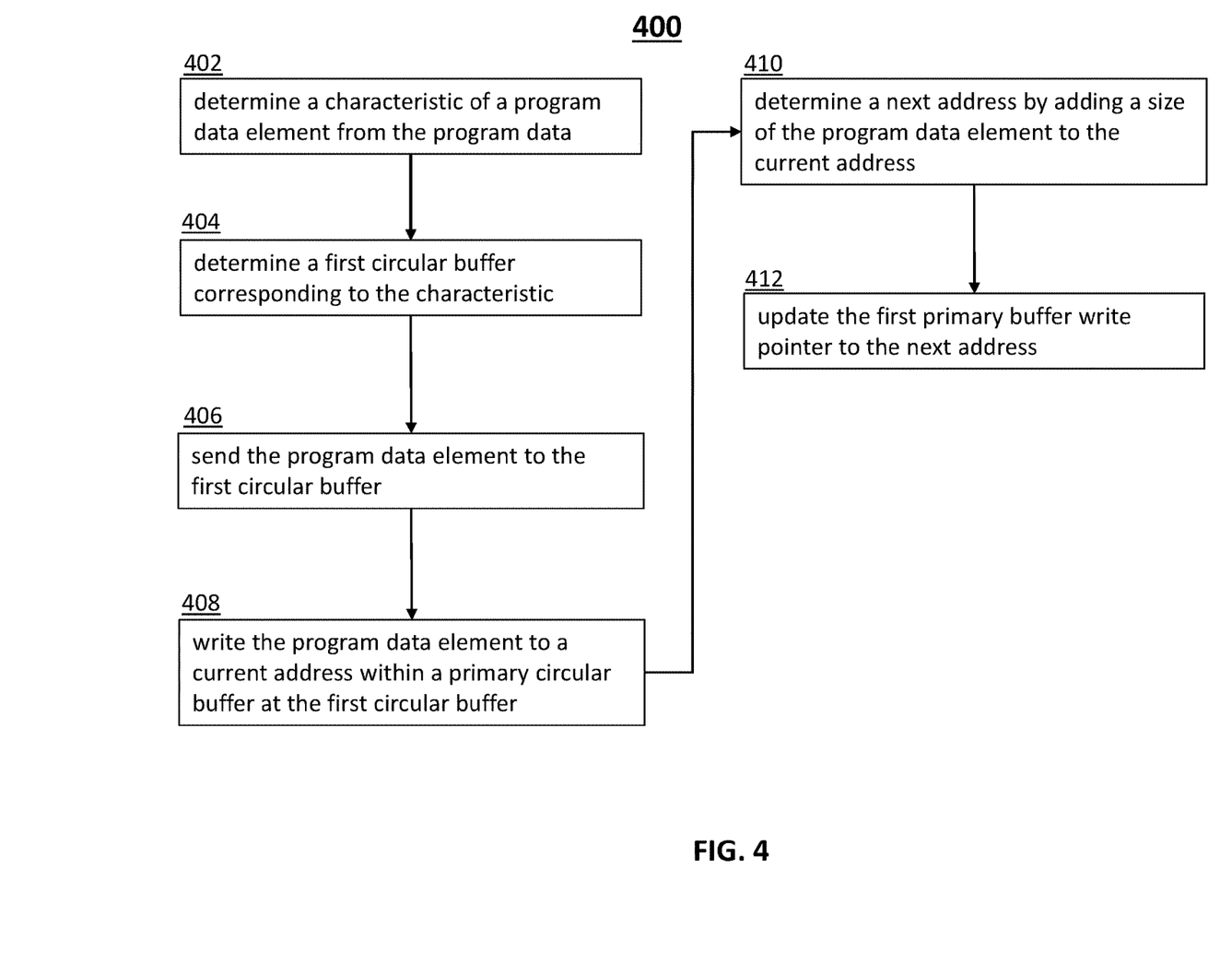
FIG. 4 provides an example logic flow diagram illustrating writing program data to the external buffer memory, according to embodiments described herein.

FIG. 4 provides an example logic flow diagram 400 illustrating writing program data to the external buffer memory (e.g., part of 308 in FIG. 3), according to embodiments described herein. At 402, the program data replay splitter determines a characteristic of a program data element from the program data, e.g., data format of the block of program data. At 404, the program data replay splitter determines a first circular buffer (e.g., any of 125a-n in FIG. 1) corresponding to the characteristic. At 406, the program data replay splitter sends the program data element to the first circular buffer at the external buffer memory. At 408, the program data replay splitter writes the program data element to a current address within a primary circular buffer (e.g., 124 in FIG. 1) at the first circular buffer (e.g., 125a in FIG. 1). At 410, the program data replay splitter determines a next address by adding a size of the program data element to the current address. At 412, the program data replay splitter updates the first primary buffer write pointer to the next address.

Figure 5:
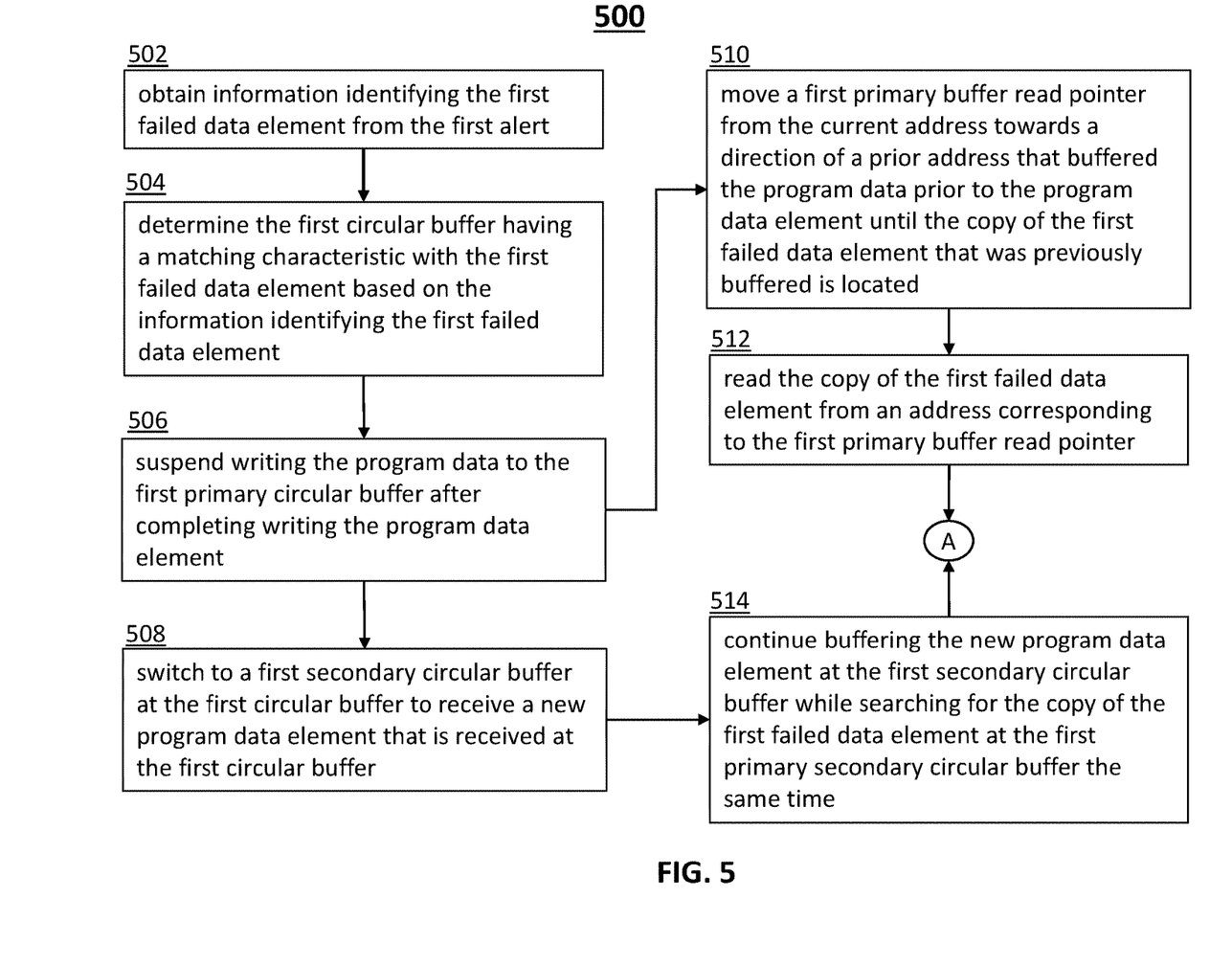
FIG. 5 provides an example logic flow diagram illustrating retrieving a copy of the failed data element from the external buffer memory in response to a NAND operation error alert, according to embodiments described herein.

FIG. 5 provides an example logic flow diagram 500 illustrating retrieving a copy of the failed data element from the external buffer memory in response to a NAND operation error alert, according to embodiments described herein. At 502, the program data reply splitter obtains information identifying the first failed data element from the first alert. At 504, the program data reply splitter determines the first circular buffer having a matching characteristic with the first failed data element based on the information identifying the first failed data element. At 506, control logic suspends writing the program data to the first primary circular buffer after completing writing the program data element. At 508, control logic switches to a first secondary circular buffer at the first circular buffer to receive a new program data element that is received at the first circular buffer, and continues buffering the new program data element at the first secondary circular buffer while searching for the copy of the first failed data element at the first primary secondary circular buffer the same time at 514. In parallel to 508 and 514, process 500 proceed from 506 to 510, where control logic moves a first primary buffer read pointer from the current address towards a direction of a prior address that buffered the program data prior to the program data element until the copy of the first failed data element that was previously buffered is located. At 512, control logic reads the copy of the first failed data element from an address corresponding to the first primary buffer read pointer.

Process 500 proceeds from 512 and 514 to 516, where the program data reply splitter determines whether a second alert indicative of a second NAND memory error is received at 516. If a second alert is received, process 500 proceeds to 518, where control logic suspends writing new program data to the first secondary circular buffer while the first primary circular buffer is still suspended from writing new program data. At 520, control logic suspends, at a host interface, receiving new program data from the host system.

Process 500 proceeds to 522, when no other alert is received right after the first alert, where control logic continues program data reception at the first secondary circular buffer.

Various embodiments discussed in conjunction with FIGS. 1-5 are performed by various electronic components of one or more electronic circuits, such as but not limited to an integrated circuit, application-specific integrated circuit (ASIC), DSP, and/or the like. Various components discussed throughout this disclosure such as, but not limited to processing devices, computers, servers, network devices, and/or the like, are configured to include a set of electronic circuit components, and communicatively operate on one or more electronic circuits. Each electronic circuit such as the SSD controller 110, etc. is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for error recovery in NAND memory operations, the method comprising:
   receiving, from a host system, program data having a plurality of program data elements to be written to a NAND memory;
   sending the program data to an internal buffer memory and an external buffer memory in parallel;
   obtaining a first alert indicative of a first NAND operation error of a first failed program data element;
   in response to the first alert, determining a memory address within the external buffer memory, at which a copy of the first failed program data element was previously buffered, based on information identifying the first failed program data element from the first alert;
   retrieving the copy of the failed program data element from the external buffer memory based on the determined memory address; and
   sending the copy of the first failed program data element to the NAND memory to recover the first NAND operation error.

2. The method of claim 1, wherein the sending the program data to an internal buffer memory and an external buffer memory in parallel comprises:
   forwarding the program data, via a program replay data splitter, to the internal buffer memory that is disposed on a same die with the program replay data splitter; and
   forwarding the program data, via the program replay data splitter, to the external buffer memory that is disposed at a location outside the die with the program replay data splitter.

3. The method of claim 2, further comprising:
   determining a characteristic of a given program data element from the program data;
   determining a first circular buffer corresponding to the characteristic, wherein the external buffer memory has a plurality of circular buffers, and each of the plurality of circular buffers corresponds to a specific characteristic of the program data; and
   sending the given program data element to the first circular buffer.

4. The method of claim 3, wherein each of the plurality of circular buffers has a respective primary circular buffer and a respective secondary circular buffer, and the method further comprises:
   writing the given program data element to a current address within a first primary circular buffer at the first circular buffer, wherein the current address is indicated by a first primary buffer write pointer;
   determining a next address by adding a size of the given program data element to the current address; and
   updating the first primary buffer write pointer to the next address.

5. The method of claim 4, further comprising:
   in response to the first alert:
      obtaining information identifying the first failed program data element from the first alert; and
      determining the first circular buffer having a matching characteristic with the first failed program data element based on the information identifying the first failed program data element.

6. The method of claim 5, further comprising:
   suspending writing the program data to the first primary circular buffer after completing writing the given program data element; and
   switching to a first secondary circular buffer at the first circular buffer to receive a new program data element that is received at the first circular buffer.

7. The method of claim 6, further comprising:
   when the new program data element has a matching characteristic with the first circular buffer:
      continuing buffering the new program data element at the first secondary circular buffer while searching for the copy of the first failed program data element at the first primary secondary circular buffer at a same time.

8. The method of claim 6, further comprising:
   receiving a second alert indicative of a second NAND operation error of a second failed program data element after the switching;
   suspending writing new program data to the first secondary circular buffer while the first primary circular buffer is still suspended from writing new program data; and
   suspending, at a host interface, receiving new program data from the host system.

9. The method of claim 5, further comprising:
   moving a first primary buffer read pointer from the current address towards a direction of a prior address that buffered the program data prior to the first failed program data element until the copy of the first failed program data element that was previously buffered is located; and reading the copy of the first failed program data element from an address corresponding to the first primary buffer read pointer.

10. The method of claim 1, further comprising:

determining, at a program data replay splitter, whether the internal buffer memory and the external buffer memory are ready to receive data;

in response to determining that one of the internal buffer memory and the external buffer memory is not to receive data, temporarily restricting from sending the program data elements of the program data to either of the internal buffer memory and the external buffer memory such that program data reception at the internal buffer memory and the external buffer memory is synchronized.

11. A system for error recovery in NAND memory operations, the system comprising:

a host interface configured to receive, from a host system, program data having a plurality of program data elements to be written to a NAND memory;

a program data replay splitter configured to:
send the program data to an internal buffer memory and an external buffer memory in parallel,
obtain a first alert indicative of a first NAND operation error of a first failed program data element, and
in response to the first alert, determine a memory address within the external buffer memory, at which a copy of the first failed program data element was previously buffered, based on information identifying the first failed program data element from the first alert; and control logic configured to:
retrieve the copy of the failed program data element from the external buffer memory based on the determined memory address, and
send the copy of the first failed program data element to the NAND memory to recover the first NAND operation error.

12. The system of claim 11, wherein the program data replay splitter is configured, when sending the program data to an internal buffer memory and an external buffer memory in parallel, further to:

forward the program data to the internal buffer memory that is disposed on a same die with the program replay data splitter; and forward the program data to the external buffer memory that is disposed at a location outside the die with the program replay data splitter.

13. The system of claim 12, wherein the program data replay splitter is configured further to:

determine a characteristic of a given program data element from the program data;

determine a first circular buffer corresponding to the characteristic, wherein the external buffer memory has a plurality of circular buffers, and each of the plurality of circular buffers corresponds to a specific characteristic of the program data; and send the given program data element to the first circular buffer.

14. The system of claim 13, wherein each of the plurality of circular buffers has a respective primary circular buffer and a respective secondary circular buffer, and the control logic is configured further to:

write the given program data element to a current address within a first primary circular buffer at the first circular buffer, wherein the current address is indicated by a first primary buffer write pointer;

determine a next address by adding a size of the program data element to the current address; and update the first primary buffer write pointer to the next address.

15. The system of claim 14, wherein the control logic is configured further to:

in response to the first alert:
obtain information identifying the first failed program data element from the first alert; and
determine the first circular buffer having a matching characteristic with the first failed program data element based on the information identifying the first failed program data element.

16. The system of claim 15, wherein the control logic is configured further to:

suspend writing the program data to the first primary circular buffer after completing writing the given program data element; and switch to a first secondary circular buffer at the first circular buffer to receive a new program data element that is received at the first circular buffer.

17. The system of claim 16, wherein the control logic is configured further to:

when the new program data element has a matching characteristic with the first circular buffer:
continue buffering the new program data element at the first secondary circular buffer while searching for the copy of the first failed program data element at the first primary secondary circular buffer at a same time.

18. The system of claim 16, wherein the program data replay splitter is configured further to receive a second alert indicative of a second NAND operation error of a second failed program data element after the switching, and wherein the control logic is configured further to:

suspend writing new program data to the first secondary circular buffer while the first primary circular buffer is still suspended from writing new program data; and suspend, at a host interface, receiving new program data from the host system.

19. The system of claim 15, wherein the control logic is configured further to:

move a first primary buffer read pointer from the current address towards a direction of a prior address that buffered the program data prior to the first failed program data element until the copy of the first failed program data element that was previously buffered is located; and read the copy of the first failed program data element from an address corresponding to the first primary buffer read pointer.

20. The system of claim 11, wherein the control logic is configured further to:

determine, at the program data replay splitter, whether the internal buffer memory and the external buffer memory are ready to receive data;

in response to determining that one of the internal buffer memory and the external buffer memory is not to receive data, temporarily restrict from sending the program data to either of the internal buffer memory and the external buffer memory such that program data reception at the internal buffer memory and the external buffer memory is synchronized.

* * * * *